US005172297A

United States Patent [19]

Imakoma et al.

[11] Patent Number: 5,172,297

[45] Date of Patent: Dec. 15, 1992

[54] LIGHTNING ARRESTOR

[75] Inventors: Takashi Imakoma; Tetsuya Nakayama, both of Aichi, Japan

[73] Assignee: NGK Insulators, Ltd., Nagoya, Japan

[21] Appl. No.: 704,507

[22] Filed: May 23, 1991

[30] Foreign Application Priority Data

May 24, 1990 [JP] Japan ........ 2-134522

[51] Int. Cl.$^5$ ........ H02H 1/00

[52] U.S. Cl. ........ 361/126; 361/117

[58] Field of Search ........ 361/117, 126, 127, 128, 361/129, 132

[56] References Cited

U.S. PATENT DOCUMENTS

| | | | |
|---|---|---|---|
| 3,963,965 | 6/1976 | Kunkle | 361/61 |
| 4,072,998 | 2/1978 | Schei | 361/117 |
| 4,467,387 | 8/1984 | Bergh | 361/132 |
| 4,665,460 | 5/1987 | Schaff | 361/137 |
| 4,675,773 | 6/1987 | Shirakawa et al. | 361/63 |

FOREIGN PATENT DOCUMENTS

| | | |
|---|---|---|
| 0183873 | 6/1986 | European Pat. Off. . |
| 60-262312 | 12/1985 | Japan . |

*Primary Examiner*—Steven L. Stephan
*Assistant Examiner*—Matthew Nguyen
*Attorney, Agent, or Firm*—Armstrong & Kubovcik

[57] ABSTRACT

An arrestor unit is disposed between the line and earth sides of transmission lines and in parallel with an insulator by way of aerial discharge gap. Arrestor units accommodated in the arrestor unit is activated by reference voltage larger than a nominal line to ground voltage of the lines and less than the overvoltage of sound phase due to single phase ground fault.

10 Claims, 4 Drawing Sheets

LIGHTNING ARRESTOR

This application claims the priority of Japanese Patent Application No. 02-134522 filed on May 24, 1990, which is incorporated herein by reference.

BACKGROUND OF THE INVENTION

1. Field of the Invention

This invention generally relates to a lightning arrestor mounted to an electric transmission tower, more particularly to a lightning arrestor having a series gap.

2. Description of the Related Art

A lightning arrestor design having a series gap is commonly used to prevent a grounding fault of overhead transmission line due to the lightning surge. Such arrestors accommodate a plurality of zinc oxide element segments having non-linear voltage-current characteristics. The arrestor unit is connected in parallel with an insulator by way of an aerial discharge gap.

In the conventional arrestor mounted to a double-circuit electric transmission system, the arrestor have been applied only in the single circuit for the purposes both to prevent double circuit faults and to minimize the installation cost. In such transmission lines, however, the lightning strike causes a grounding fault on the circuit in which the arrestor is not installed. The ground fault causes an increase in the nominal line to ground voltage E of the other circuit carrying the arrestor. It is assumed that the ground fault causes a voltage increase of up to the voltage of $\sqrt{3}$.E in case of non-effective grounding system. Since it is required for the arrestor to be operated when the line voltage is $\sqrt{3}$.E, the reference voltage or the critical operating voltage of the arrestor unit should be at least $\sqrt{3}$.E. The length of arrestor unit is determined by the rated voltage, that is the number of zinc oxide block is determined by the increased line to ground voltage E.

However, such an arrestor unit having a rated voltage of $\sqrt{3}$.E includes a rather large number of arrestor elements for safely absorbing the lightning surge. Thus, the resultant arrestor is not compact and economical.

Furthermore, the insulating level or flashover voltage due to the lightning surge should be kept sufficiently lower than that of the insulator to reliably absorb the lightning surge in the arrestor. The lightning surge flashover voltage in the arrestor is the sum of the lightning surge flashover voltage in the aerial discharge gap plus the bias voltage in the arrestor elements. This bias voltage is generally in proportion to the reference voltage or critical operating voltage. Thus, when the number of arrestor element segments increases, the reference voltage becomes higher in accordance therewith. This effectively becomes a limitation when trying to lowering the insulating level of the arrestor unit. Especially, when the arrestor is mounted to the tower carrying a small number of insulators, it is difficult to obtain a sufficient insulation co-ordination between the circuit lines as well as between the arrestor unit and insulator, causing the insulating levels being relatively close to each other. This results in a disadvantage of the arrestor whereby the lightning surge is not reliably absorb to perfectly prevent ground faulting.

Further, in the event that the arrestor is mounted to a suspension tower, the discharge electrode tends move due to swinging of the lines in the wind. This varies the length of the discharge gap. The extension of the discharge gap makes it impossible to obtain the sufficient insulation co-ordination, causing the frequent grounding faults. Therefore, the conventional gapped type arrestor requires an extended discharge electrode with a complicated structure in order to keep the discharge gap at a predetermined length.

When studying the above problems in the conventional art, the present inventor became aware that an arrestor having the arrestor elements of which the rated voltage is less than $\sqrt{3}$.E is still able to absorb the lightening induced surge without being damaged. At the time of a lightening strike, it is very rarely necessary for the arrestor to absorb the lightning surge with a voltage as high as $\sqrt{3}$.E.

SUMMARY OF THE INVENTION

Therefore, it is an object of the present invention to provide an arrestor capable of remarkably lowering in the number of lightening faults for assuring the high reliability.

It is another object of the present invention to provide an compact and light arrestor.

To achieve the above objects, the present invention includes an arrestor unit connected in parallel to an insulator by way of an aerial discharge gap and a plurality of arrestor elements accommodated in the arrestor unit. The arrestor elements are activated by a reference voltage higher than the nominal line to ground voltage of the lines and less than the overvoltage of sound phase due to a single phase ground fault.

BRIEF DESCRIPTION OF THE DRAWINGS

The features of the present invention that are believed to be novel are set forth with particularity in the appended claims. The invention together objects and advantages thereof, may best be understood by reference to the following description of the presently preferred embodiments together with the accompanying drawings in which:

DETAILED DESCRIPTION OF THE PREFERRED EMBODIMENTS

First Embodiment

The first embodiment of the present invention will be described hereinafter in reference with FIGS. 1 and 2. In the first described embodiment, arrestors are carried on the transmission lines of a single circuit system of a double circuit system having a nominal voltage of 66 kv.

Figure 2:
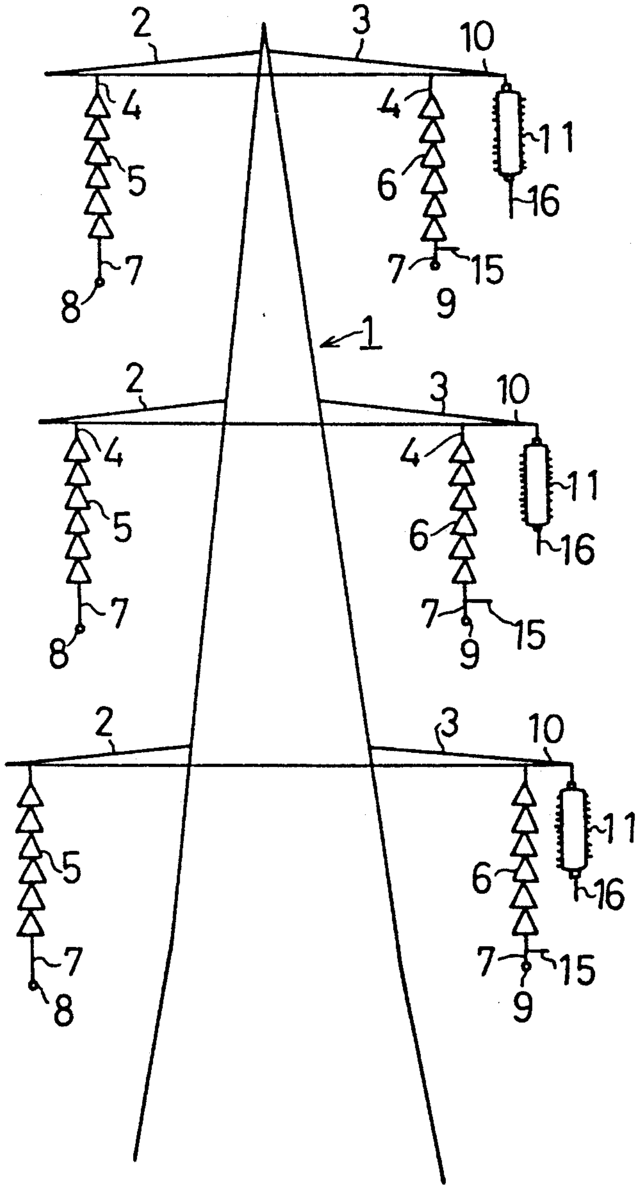
FIG. 2 is a schematic view showing a mounting structure of the arrestor illustrated in FIG. 1.

As illustrated in FIG. 2, a tower 1 that carries the power lines in a double circuit electrical transmission circuit typically has two set of three support arms 2, 3 horizontally extending in opposite directions. An insulator 5, 6 is carried near the end portion of each of the arms. The insulators are assembled from a plurality of suspended insulator pieces connected in series at are secured to the arms 2, 3 by way of support member 4, respectively. Support member 7 are carried by the lower portion of the insulators 5, 6 to support an associated transmission lines 8, 9 (which extend perpendicular to the cross section shown in FIG. 2). Each circuit includes three phase transmission lines.

As illustrated in FIG. 2, an arrestor unit 11 is firmly suspended from the end of each right support arm 3. The arrestor units are supported by mounting adapters 10. Since the construction of each of the arrestor units may be the same, the construction of only one will be described in order to simplify the explanation.

Figure 1:
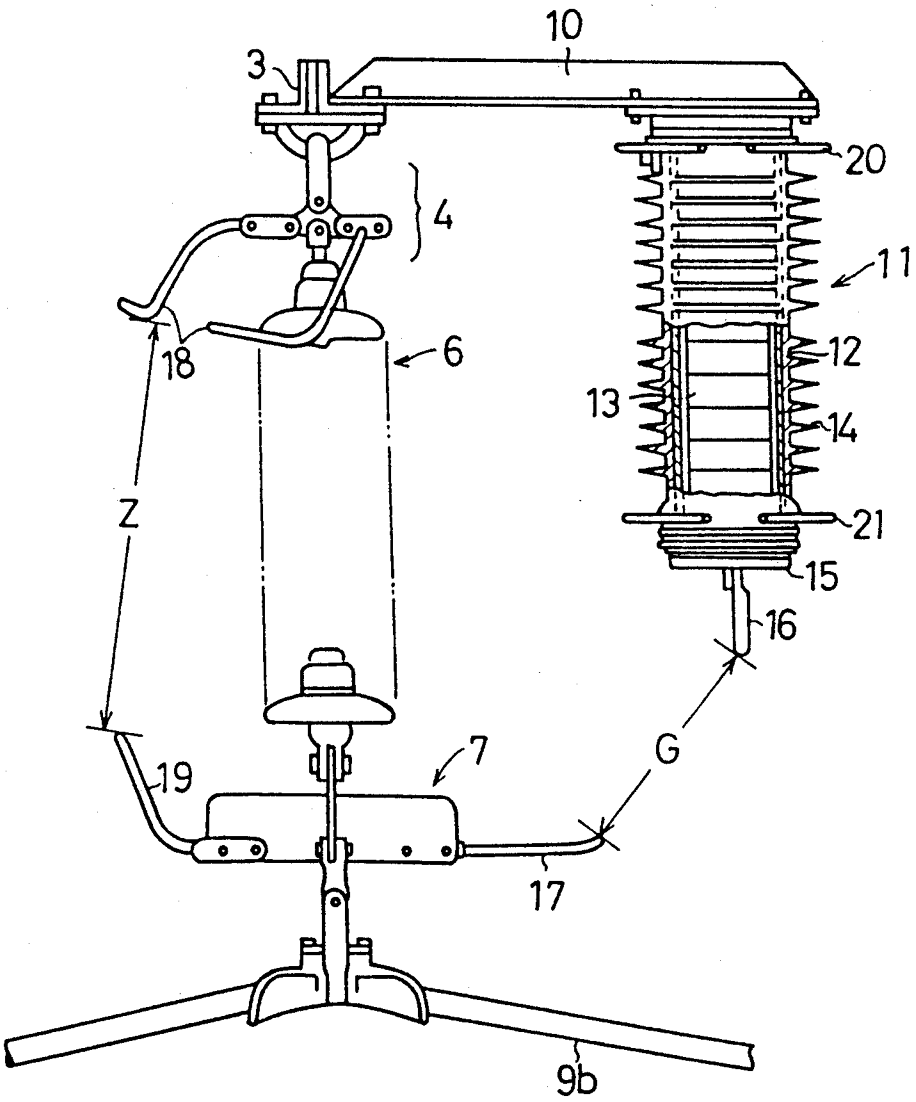
FIG. 1 is a front view showing an arrestor of a first embodiment according to the present invention.

As illustrated in FIG. 1, the arrestor unit 11 includes a pressure proof insulating cylinder 12 made of the reinforced plastic such as a fiber reinforced plastic. An arrestor element composed of a plurality of arrestor element segments 13 is accommodated in the cylinder 12. An insulating housing 14 is secured to the outer and inner peripheral surfaces of the cylinder 12 by means of a molded rubber.

Each arrestor element segment 13 is in major part made of zinc oxide, which has a non-linear voltage-current characteristic. By way of example, in the present embodiment, each arrestor element segment 13 is cylindrical in shape with a diameter of 4.5 cm and thickness of 2.0 cm. The reference voltage or critical operating voltage of the arrestor element 11 (at 1 ampere) is set to be at least 5.0 kv (peak value). In this embodiment, eight arrestor elements 13 are stacked to obtain the predetermined desired length of arrestor elements 13. The rated voltage of an arrestor unit 11 of the described size and length is 40 kv (i.e. 69 kv/$\sqrt{3}$) and is suitable for a transmission line having a nominal voltage of 66 kv. The rated voltage essentially determining the length of the arrestor element is substantially equal to the nominal line to ground voltage E. The reference voltage is set to be larger than that of the voltage E.

An arrestor unit 11 accommodating twelve arrestor element segments 13 has an outer diameter of 20 cm and a length of 46 cm. Such an arrestor unit 11 has a gross weight of approximately 10 kg.

In a conventional arrestor unit applied to the same circuit system as described above, the rated voltage is set to be $\sqrt{3}$ times the nominal line to ground voltage E. Therefore, the rated voltage is set to 69 kv which is equal to the maximum line voltage. Such a conventional arrestor unit requires 20 elements and has a diameter of 200 mm, a length of 63 cm and a gross weight of 14 kg.

The actual size of arrestor units in accordance with the present invention will of course vary with the nominal voltage of the associated line. Suitable arrestor sizes for various specific applications are set forth in Table I below. In this table the corresponding data for conventional arrestor units is also presented for ready comparison.

TABLE I

| | | | | |
|---|---|---|---|---|
| Nominal voltage (kv) | 33 | 77 | 110 | 154 |
| Overvoltage of sound phase due to single phase ground fault (kv) | 34.5 | 80.5 | 115.0 | 161.0 |
| Rated voltage (kv)* | 34.5 | 80.5 | 115.0 | 161.0 |
| ** | 20.0 | 47.0 | 67.0 | 93.0 |
| Number of elements* | 10 | 23 | 33 | 46 |
| ** | 6 | 14 | 19 | 27 |
| Total Weight (kg)* | 9 | 16 | 25 | 30 |
| ** | 7 | 11 | 14 | 19 |

*conventional art
**present invention

An earth side discharge electrode 16 is secured to a line side electrode bracket 15 in the arrestor unit 11. A line side discharge electrode 17 is supported by the lower member 7 of the insulators 6. The tip of the electrode 17 is separated from the electrode 16 by a discharging gap G having a predetermined length. It is to be noted that the electrode 17 is formed in the shape of a short bar and extends substantially horizontally for holding its tip to be in inner side relating to the electrode 16. Arc rings 20, 22 are mounted on an electrode fitting to minimize damage due to the pressure release.

Arc horns 18, 19 are mounted to the upper and lower support member 4, 7 respectively, so that the lightning induced cascading flashover on insulators 5, 6 is prevented. An arc horn gap Z is formed between the arc horns 18, 19 for avoiding flashover due to an inner abnormal voltage. More specifically, arc horn gap Z of a 66 kv transmission line is approximately 590 mm long and its 50% flashover voltage is approximately 375 kv. On the other hand, the discharging gap G formed between rod-rod electrodes is approximately 390 mm in length and its 50% flashover voltage is approximately 300 kv. Thus, the insulating level in arrestor unit 11 is remarkably smaller than that of the insulators 5, 6.

It is to be noted that 50% flashover voltage in a conventional arrestor unit having the same discharge gap G of 390 mm long is approximately 350 kv. Thus, this arrestor unit 11 can reduce the magnitude of 50% flashover voltage to 80% of that of the conventional art. In the other words, the flashover voltage of the present arrestor unit 11 is reduced to a magnitude close to that of bias voltage of arrestor elements 13, so that the present arrestor unit 11 can obtain sufficient insulation coordination.

Since the insulating level is set to be approximately 80% of that of the line 8 without arrestor, the lightning surge current is reliably absorbed by the lightning arrestor in the event of lightning strike on the transmission. Therefore, the number of grounding faults in the line 8 is decreased. Furthermore, the arrestor unit 11 which has an insulating level sufficiently lower than that of the insulator 6, allows the lightning surge current to pass therethrough to be discharged to the earth.

Further, it is noted that the length of the discharge gap G is apt to be changed due to swinging of the insulator 6 as it is blown by wind. This result in the arrestor having an unstable insulating level. However, in the present embodiment, the reduced insulating level of the arrestor insures that the highest magnitude of the insulating level remains less than that of the insulators 5, 6 regardless of variations in the discharge gap G due to swing by winds within the allowable range.

SECOND EMBODIMENT

Figure 3:
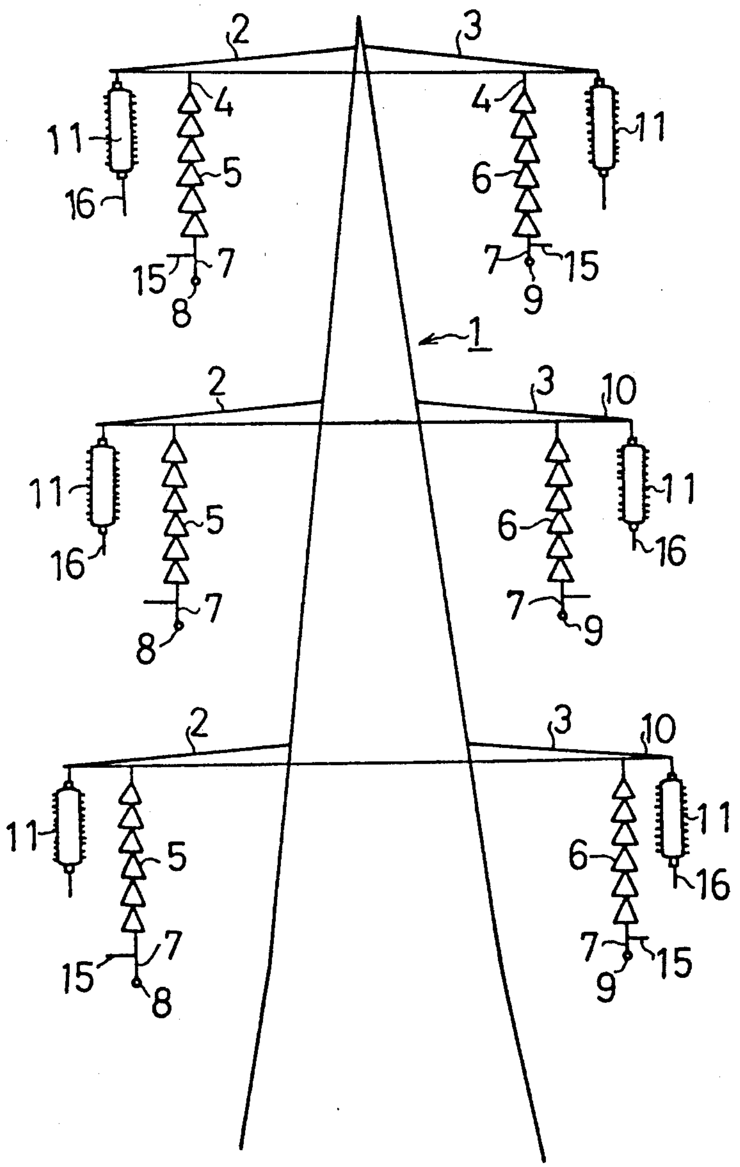
FIG. 3 is a schematic view showing a mounting structure for an arrestor in a second embodiment of the present invention.

The second embodiment of the present invention will be hereinafter explained in reference with FIG. 3.

In this embodiment, the lightning arrestor of the first embodiment is used both circuits of the double circuit transmission system. That is, each of the insulators 5, 6 has an associated lightning arrestor with sufficient insulating co-ordination ability to prevent the grounding faults. Therefore, the greater reliability of the arrestor is assured in this embodiment than in the first embodiment wherein only the single circuit 9 carries the arrestor.

It is to be noted that the present embodiment also provides the economical construction, because the arrestor is compact and very low priced in comparison with the conventional arrestor.

THIRD EMBODIMENT

Figure 4:
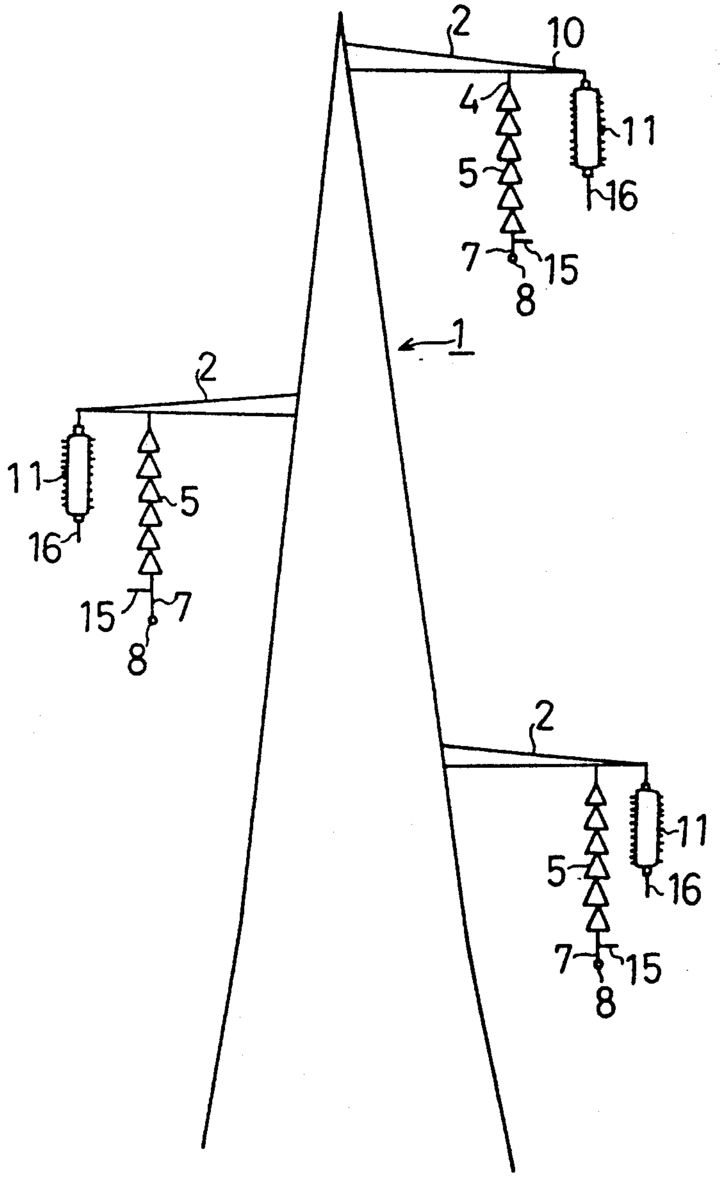
FIG. 4 is a schematic view showing a mounting structure of an arrestor in a third embodiment of the present invention.

The third embodiment of the present invention will be hereinafter explained in reference to FIG. 4. In this embodiment, the lightning arrestor used in the foregoing embodiments is coupled to single circuit transmission lines. As the arrestor is mounted to every insulator, the number of grounding faults in the line is remarkably reduced. This leads the described lightning arrestor to be less outlay-spending than conventional arrestors in view of total cost including product cost, market cost, maintenance cost etc.

Although three embodiments of the present inventions have been described herein, it should be apparent to those skilled in the art that the present invention may be embodied in many other specific forms without departing from the spirit or scope of the invention. For instance, the arrestor could be carried by the tension type tower in place of the suspension type tower.

What is claimed is:

1. A lightning arrestor for use in a multiple phase electrical transmission system having multiple transmission lines each carrying a single phase current, wherein each transmission line is supported by an insulator, the electrical transmission system being arranged such that in an occurrence of a single phase ground fault in a first line, remaining lines experience a sound phase overcurrent, the lightning arrestor comprising:
   - an arrestor unit connected outside of and in parallel to an associated insulator with an aerial discharge gap formed therebetween;
   - a plurality of arrestor elements contained within the arrestor unit, said plurality of arrestor elements being activated at a reference voltage higher than a nominal voltage of an associated transmission line and less than the overvoltage of a sound phase due to a single phase ground fault; and
   - arc horn means coupled to upper and lower portions of said insulator for avoiding a flashover due to an occurrence of an abnormal voltage.

2. A lightning arrestor as set forth in claim 1 further comprising a transmission line loading side discharge electrode at a bottom portion of said insulator and a ground side discharge electrode at a bottom portion of said arrestor unit, said loading side discharge electrode having a tip directed to an inner side portion of said ground side discharge electrode.

3. A lightning arrestor as set forth in claim 1, wherein said lightning arrestor is coupled to a single circuit of a double circuit transmission system.

4. A lightning arrestor as set forth in claim 1, wherein said lightning arrestor is coupled to both circuits of a double circuit transmission system.

5. A lightning arrestor as set forth in claim 1, further comprising arc horns coupled to upper and lower portions of said insulator, said arc horns forming a gap therebetween to thereby avoid a flashover due to an occurrence of an abnormal voltage.

6. A lightning arrestor for use in a multiple phase electrical transmission system having multiple transmission lines each carrying a single phase current, wherein each transmission line is supported by an insulator, the electrical transmission system being arranged such that in an occurrence of a single phase ground fault in a first line, remaining lines experience a sound phase overcurrent, the lightning arrestor comprising:
   - an arrestor unit connected outside of and in parallel to an associated insulator with an aerial discharge gap formed therebetween;
   - a plurality of arrestor elements contained within the arrestor unit, said plurality of arrestor elements being activated at a reference voltage higher than a nominal voltage of an associated transmission line and less than the overvoltage of sound phase due to single phase ground fault; and
   - a transmission line loading side discharge electrode at a bottom portion of said insulator and a ground side discharge electrode at a bottom portion of said arrestor unit, said loading side discharge electrode having a tip directed to an inner side portion of said ground side discharge electrode.

7. A lightning arrestor as set forth in claim 6, wherein said lightning arrestor is coupled to a single circuit of a double circuit transmission system.

8. A lightning arrestor as set forth in claim 6, wherein said lightning arrestor is coupled to both circuits of a double circuit transmission system.

9. A lightning arrestor as set forth in claim 5, further comprising arc horns coupled to upper and lower portions of said insulator, said arc horns forming a gap therebetween to thereby avoid a flashover due to an occurrence of an abnormal voltage.

10. A lightning arrestor for use in a multiple phase electrical transmission system having multiple transmission lines each carrying a single phase current, wherein each transmission line is supported by an insulator, the electrical transmission system being arranged such that in an occurrence of a single phase ground fault in a first line, remaining lines experience a sound phase overcurrent, the lightning arrestor comprising:
    - an arrestor unit connected outside of and in parallel to an associated insulator with an aerial discharge gap formed therebetween;
    - a plurality of arrestor elements contained within the arrestor unit, said plurality of arrestor elements being activated at a reference voltage higher than a nominal voltage of an associated transmission line and less than the overvoltage of a sound phase due to a single phase ground fault; and
    - arc horns coupled to upper and lower portions of said insulator, said arc horns forming a gap therebetween to avoid a flashover resulting from an occurrence of an abnormal voltage.

* * * * *